Patented May 16, 1939

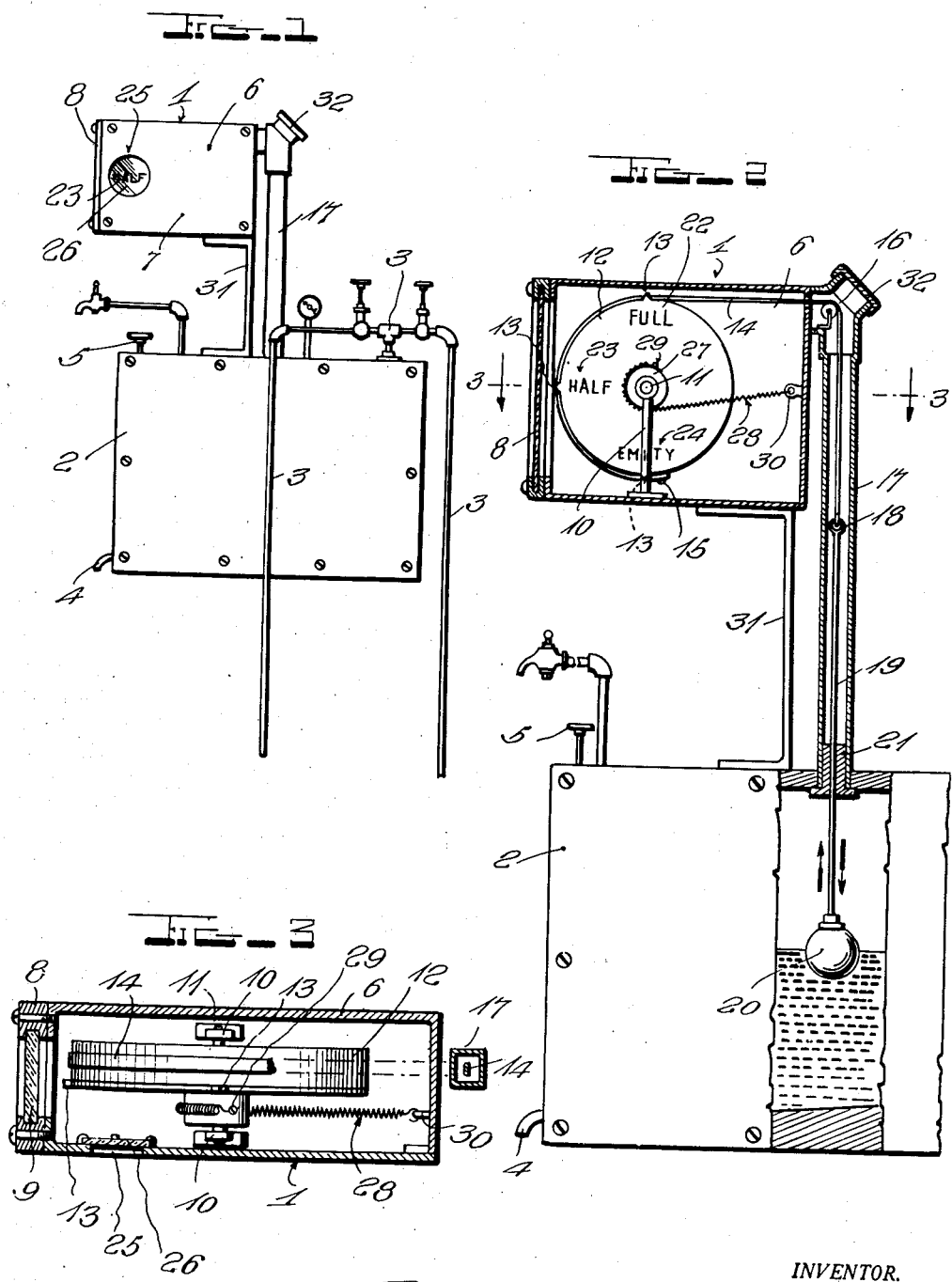

2,158,936

UNITED STATES PATENT OFFICE 2,158,936

VOLUME INDICATOR

Raymond A. Hennings, New Orleans, La.

Original application November 5, 1935, Serial No. 48,400. Divided and this application January 21, 1938, Serial No. 186,205

1 Claim. (Cl. 73—321)

My present invention pertains to dispensing apparatus for liquid carbonic beverages and it contemplates the provision of simple and inexpensive means whereby the operator may readily determine the amount of beverage remaining in a container from which the beverage is being withdrawn.

The invention further contemplates the arrangement of elements for indicating the amount of liquid present in a container and is specifically adapted for use in connection with my parent application titled Beverage and liquid dispenser filed November 5, 1935, Serial No. 48,400 and of which the present application is a division.

Other objects of my invention will be fully understood from the following description and claim when the same are read in connection with the drawing accompanying and forming part of this specification, in which:

Figure 1 is a side elevation of my novel indicator.

Figure 2 is a transverse sectional view thereof.

Figure 3 is a view taken in the plane indicated by the line 3—3 of Figure 2 and looking in the direction of the arrows.

Similar numerals of reference designate corresponding parts in all the views of the drawing.

My novel indicator comprises a casing 1 that is supported on a dispensing tank 2 that in turn is in communication with a source of beverage supply through the medium of the conduit 3 and the said tank 2 is provided with a sediment draw-off spigot 4 controlled by the valve handle 5.

The casing 1 is provided with the housing 6 having a side plate 7 and a face plate 8 and mounted in the plate 8 is an observation glass 9. Arranged within the casing 6 is a bracket 10 and mounted on this bracket is a revoluble shaft 11 of a rotatable drum 12. This drum 12 is provided with indicator points 13 and adapted to surround the drum 12 is a flexible band or strap 14 which is secured at one end to the drum 12 by the fastening means 15. It will be noted that the pointers 13 engage the strap 14 so as to guide the strap over the drum during operation thereof.

Mounted on the rear of the tank or indicator 1 is a longitudinal housing 17 and arranged within this housing 17 is a pulley 16 over which the strap 14 travels during its movement. It will be seen by reference to Figure 2 that strap 14 is secured through the medium of an eye 18 to the rod 19 and mounted on the lower end of the rod 19 is a float 20 centered within the housing 17 by means of the guide bearing 21.

As clearly indicated legends indices 22, 23 and 24 are arranged on the drum 12.

On one side of housing 6 of the indicator 1 an aperture 25 is provided and arranged over this aperture is a glass plate 26.

In addition to the large drum 12 I also provide on the shaft 11 a smaller drum 27 and secured to the drum 27 at 29 is a spring 28 and this spring is also secured to an eye or fastener 30 within the housing 6. As shown in Figures 1 and 2 the indicator 1 is supported on the tank 2 by means of the bracket 31 and in order to permit access to the housing 17, should the occasion arise, I provide in said housing a screw cap 32.

In the practical operation of my invention, it is assumed that the tank 2 is full and in such case the float 20 will mainfestly rise to the top of said tank. In such case the rod 19 will force the strap 14 upwardly so that the legend "Full" of the drum 12 will appear behind the glass 26. Naturally, the rotation of the drum 12 and consequently the small drum 27 will cause the spring 28 to contract to its inoperative position. As the beverage is drawn out of the tank 2 the float will descend carrying with it the rod and strap. This operation will also place the spring 28 under tension after the manner shown in Figure 2 and consequently it will be seen that when the drum 12 is rotating the said spring will assist in the normal rotation of said drum and hence cause the float to normally rest on the upper surface of the beverage at all times.

It will be noted that because of the extreme simplicity, the operation of the device is normally constant and that the extent of the contents of the tank 2 will be clearly indicated to the operator at all times.

What I claim is:

In combination with a beverage dispensing tank, a first casing mounted on the tank, a second casing comprising an indicator casing bracketed on the tank, a passage between said second casing and said first casing, a sight opening formed in one face of the indicator, a guide bearing arranged in the first casing, a rod movable within the first casing and guide bearing and having a float on one end adapted to bear on the liquid within the tank and move upwardly and downwardly according to the level of the liquid within the tank, a series of revoluble drums rigidly secured together mounted within the indicator casing one of which is provided with legends, a strap secured to and movable with one of the drums and passing through said passage secured at its free end to the rod of the float and a spring secured to one of the drums and to the indicator casing and means comprising a removable closure for obtaining access to the first casing at the top, substantially as and for the purpose specified.

RAYMOND A. HENNINGS.